(12) United States Patent
Brand

(10) Patent No.: US 9,496,911 B2
(45) Date of Patent: Nov. 15, 2016

(54) PROTECTIVE COVER AND RETRACTABLE LANYARD

(71) Applicant: 3B PRODUCT DEVELOPMENT, LLC, Palm Harbor, FL (US)

(72) Inventor: David Brand, Palm Harbor, FL (US)

(73) Assignee: 3B Product Development, LLC, Palm Harbor, FL (US)

( * ) Notice: Subject to any disclaimer, the term of this patent is extended or adjusted under 35 U.S.C. 154(b) by 0 days.

(21) Appl. No.: 14/911,439

(22) PCT Filed: Sep. 23, 2014

(86) PCT No.: PCT/US2014/056955
§ 371 (c)(1),
(2) Date: Feb. 10, 2016

(87) PCT Pub. No.: WO2015/048006
PCT Pub. Date: Apr. 2, 2015

(65) Prior Publication Data
US 2016/0197636 A1    Jul. 7, 2016

Related U.S. Application Data

(60) Provisional application No. 61/881,545, filed on Sep. 24, 2013, provisional application No. 61/899,935, filed on Nov. 5, 2013, provisional application No. 61/937,269, filed on Feb. 7, 2014, provisional application No. 61/945,432, filed on Feb. 27, 2014.

(51) Int. Cl.
*A45F 5/00* (2006.01)
*H04B 1/3888* (2015.01)
*A45C 11/00* (2006.01)

(52) U.S. Cl.
CPC ............ *H04B 1/3888* (2013.01); *A45C 11/00* (2013.01); *A45F 5/00* (2013.01); *A45C 2011/002* (2013.01); *A45F 2005/006* (2013.01)

(58) Field of Classification Search
CPC ............ A45F 2005/006; A45F 5/004; A45F 2200/0516; A45F 5/00; A45F 2200/0508; A45F 2200/0528; H04M 1/15; H04R 1/1033
USPC .......................................................... 224/162
See application file for complete search history.

(56) References Cited

U.S. PATENT DOCUMENTS

| 2,441,902 A | 5/1948 | Powell |
| 5,938,137 A | 8/1999 | Poulson |

(Continued)

FOREIGN PATENT DOCUMENTS

| CN | 1218456 C | 9/2005 |
| CN | 201435748 Y | 3/2010 |

(Continued)

*Primary Examiner* — Adam Waggenspack
(74) *Attorney, Agent, or Firm* — Christopher Paradies; Paradies Law P.A.

(57) ABSTRACT

A protective cover and retractable lanyard device comprises a retraction device, removably integratable within the protective cover for an electronic device. A pair of tethers retractably extend from an outlet of the retraction device forming a lanyard when joined together by a coupling. The protective cover may protect an electronic device, such as a cellular phone by fitting securely over the electronic device, during use of the electronic device, without interfering with use of the electronic device. A void in the cover provides a cut-out engaging the retraction device, such that the retraction device may be securely retained in the cut-out by a portion of the cover.

14 Claims, 4 Drawing Sheets

(56) References Cited

U.S. PATENT DOCUMENTS

| | | | |
|---|---|---|---|
| 5,976,083 A * | 11/1999 | Richardson | A61B 5/0245 482/8 |
| 6,053,381 A | 4/2000 | Fahl et al. | |
| 6,094,566 A | 7/2000 | Dasent et al. | |
| 6,502,727 B1 | 1/2003 | Decoteau | |
| 6,662,986 B2 | 12/2003 | Lehtonen | |
| 6,731,956 B2 | 5/2004 | Hanna et al. | |
| 7,151,912 B1 | 12/2006 | Morrison | |
| 7,340,221 B2 | 3/2008 | Wikel et al. | |
| 7,354,304 B2 | 4/2008 | Livingston | |
| 7,458,488 B2 | 12/2008 | Bass et al. | |
| 7,650,007 B2 | 1/2010 | Iuliis et al. | |
| 7,661,567 B2 | 2/2010 | Myers | |
| 7,665,684 B2 | 2/2010 | Salentine et al. | |
| 8,317,067 B2 * | 11/2012 | Lewis | A45F 5/02 224/183 |
| 8,371,486 B2 | 2/2013 | Imafuku et al. | |
| 8,408,513 B2 | 4/2013 | Smith | |
| 8,579,172 B2 * | 11/2013 | Monaco | H04M 1/15 224/191 |
| 8,761,430 B2 * | 6/2014 | Zimmerman | H04R 1/1033 381/374 |
| 8,915,409 B2 * | 12/2014 | Smith | B65H 75/4428 224/162 |
| 2005/0011982 A1 | 1/2005 | Salentine et al. | |
| 2005/0255898 A1 | 11/2005 | Huang | |
| 2006/0113345 A1 | 6/2006 | Zoullas et al. | |
| 2007/0278265 A1 | 12/2007 | Contente | |
| 2009/0013719 A1 | 1/2009 | Loving et al. | |
| 2009/0143116 A1 | 6/2009 | Harmon et al. | |
| 2012/0153064 A1 | 6/2012 | Votel et al. | |
| 2012/0273541 A1 | 11/2012 | Zwach | |
| 2012/0314351 A1 * | 12/2012 | Kroupa | B65H 75/4434 361/679.01 |
| 2013/0029725 A1 | 1/2013 | Heil-Brice et al. | |
| 2013/0072266 A1 | 3/2013 | Shattuck et al. | |
| 2013/0129138 A1 | 5/2013 | Washington, Jr. | |

FOREIGN PATENT DOCUMENTS

| | | |
|---|---|---|
| CN | 202664469 U | 1/2013 |
| WO | 2011/088395 A1 | 7/2011 |
| WO | 2013/126020 A1 | 9/2013 |
| WO | 2014/173814 A1 | 10/2014 |

* cited by examiner

PROTECTIVE COVER AND RETRACTABLE LANYARD

CROSS RELATED APPLICATIONS

This application is a 371 national phase application based on PCT/US2014/056955 filed Sep. 23, 2014 which claims priority from U.S. Provisional Application No. 61/945,432, filed Feb. 27, 2014; 61/899,935, filed Nov. 5, 2013; and 61/881,545 filed Sep. 24, 2013; and 61/937,269, filed Feb. 7, 2014. The entire disclosures and drawings of each of these are hereby incorporated by reference in their entirely.

FIELD OF THE INVENTION

The field relates to tethers used to prevent accidental damage from dropping electronic devices.

BACKGROUND

US Patent Publication No. 20090013719 A1 discloses a decorative cellular phone necklace capable of holding a flip phone style of cellular phone. The decorative necklace is not a tether, is not retractable and is not integratable into a cellular phone case or protective device. US Patent Publication No. 20060113345 A1 discloses a lanyard assembly worn around the neck and wrist and capable of attaching to an article, such as an electronic device. However, lanyard is not retractable and is not integratable into a cellular phone case or protective device. Instead, a connecting portion of the lanyard includes an adhesive for attaching the article to the lanyard. A problem with adhesives is that those adhesives that are removable are not particularly secure and those adhesives that are secure are hardly removable. Thus, to safely secure a cellular phone to the lanyard, the connecting portion must be permanently adhered to a portion of the cellular phone, marring the appearance of the cellular phone.

Patent Publication No. US 20090143116 A1 discloses a retractable attachment post suitable for integration in a cellular phone case. This does not mar the appearance of the cellular phone exterior when not in use. Also, U.S. Pat. No. 6,094,566 discloses a retractable lanyard wire/hail for a portable telecommunications device. The bail extends and retracts through a slot in the bottom housing of the cellular phone. U.S. Pat. No. 6,662,986 discloses a mobile phone strap holder connectable to openings in corners of the mobile phone housing. A flexible line is passed through the openings and cooperates with the strap and a latch that secures ends of the flexible line. The lanyard is not retractable or integratable within the cellular phone case.

U.S. Pat. No. 6,502,727 B1 discloses a retractable tether and an attachment device capable of being attached to a cellular phone or other electronic device or other handheld object. The lanyard has a housing separate from the electronic device. The housing includes a spooling mechanism and a spring for repeatedly unspooling and respooling the lanyard within the housing. A tether extends outside of the housing and includes a magnet that securely fastens the lanyard to a magnet secured to the electronic device. However, having a powerful magnet, capable of securing the cellular phone to the tether of the lanyard, so close to a cellular phone is inadvisable. Furthermore, the lanyard is not retractable and integratable within the cellular phone case. The spool and housing for the tether is separate from the cellular phone case, is bulky and is not integratable with the cellular phone case for retraction of the tether within the cellular phone case. Also, U.S. Pat. No. 7,665,684 B2 discloses a retracting tether for cellular phones, pagers and PDAs. The retracting tether must be clipped to a belt, pants or purse next to the location in which the device is being held or stored in order to secure the device. A mechanism allows the device to be attached or removed from the retractable tether, but the retractable tether is not retractable into the case of the cellular phone and is not integratable within the cellular phone case.

U.S. Pat. No. 7,650,007 B2 discloses a lanyard for handheld electronic devices including ear buds integrated within the lanyard. US Patent Publication No. 20130072266 discloses a lanyard with integrated headphones and microphone, allowing hands-free use of a mobile device, such as a cellular phone. The lanyard may be magnetically coupled the cellular phone case. Also, U.S. Pat. No. 6,502,727 discloses another magnetically couplable tether and external, bulky housing. These reference fail to disclose a lanyard retractable into the cellular phone case and integratable within a cellular phone case.

US Patent Publication No. 20130029735 discloses a wired headset for mitigating the health risks of using a cellular phone emitting radiation until the wired headset is extended at least 10 inches from the cellular phone. An earphone is electronically connected to the cellular phone via a cord of sufficient length to permit the cellular phone to be located more than 10 inches from brain tissue during operation of the cellular phone. An automatic shutoff mechanism prevents operation of the cellular phone unless the cord is extended at least ten inches. The earphone is attached by a wire that is retractable into a cellular phone case, but the length of the wire is limited and the earphone and wire is not a tether and does not provide a lanyard.

U.S. Pat. No. 7,661,567 discloses a button attached to a ring by a retractable tether capable of being retracted into the button. The length of the retractable tether is limited by the size of the button, and the button is adhesively secured to a device such as a cellular phone. The ring is worn on a finger to help secure the phone from accidental damage while being held by a user, such as accidentally dropping the cellular phone.

U.S. Pat. No. 5,938,137 discloses a cellular phone leash capable of being attached to a cellular phone case. A separate, bulky leash cord housing includes a spring retraction mechanism and a spring retractable leash cord. The housing is pivotally attachable to a belt by a clip. U.S. Pat. No. 7,354,304 discloses a retractable cord assembly for securing a portable electronic device by a tether. The tether is retractable into a separate housing. The housing may be coupled and decoupled to cellular phone case by an attachment mechanism adhesively secured on the cellular phone case but is not integrated within a cellular phone case.

US Patent Publication No. 20130129138 discloses a multi-function phone case integrating retractable earphones. The multi-function case is capable of receiving a wireless mobile phone and has a retractable headset integrally disposed within the multi-function phone case. The earbuds are connected by a wire, but the wire does not provide a lanyard. A spring-biased, ratcheted reel is included within the multi-functional case for retractably extending and retracting a pair of earbuds. U.S. Pat. No. 6,731,956 discloses an integrated spool within a cellular phone case for spooling, extandably, earbuds from the cellular phone case from a spring-loaded spool. Also, U.S. Pat. No. 7,151,912 discloses a cable retractor for an electronic device capable of retracting a cable onto a rotatable reel. The rotatable reel retracts the cable using a biasing force, unless a moveable actuator is positioned to impede retracting of the cable.

U.S. Pat. No. 7,340,221 discloses an adapter for a modular wireless communication device including a lanyard and a cradle coupled to the lanyard. The cradle is includes an audio plug configured to provide a connection to a short range wireless communication module when the short range wireless communication module is coupled to the cradle. A microphone and earbud is electrically coupled to the cradle by the lanyard and the audio plug.

US Patent Publication No. 20050011982 discloses a tethering system and holster for personal electronic devices. A tether is provided internal to a housing for the personal electronic device when the device is holstered in the holster. A spring mechanism within the housing is arranged to allow the tether to be extended from the tether housing against a bias force exerted by the spring, which provides a retraction force for retracting the tether into the housing. The holster can be worn on a belt. Also, U.S. Pat. No. 8,579,172 discloses a case and covers for an electronic handheld device. Another retractable lanyard has an adapter that connects directly to the docking port of a personal media device. The lanyard is retractable into a separate housing that can be connected to a belt or other point of attachment on a person.

US Patent Publication No. 20120273541 discloses yet another device for connecting a flexible strap or lanyard to a handheld device including a case, a connection point or points located on the case, and a strap capable of being secure to the connection point or points on the case.

International patent application no. WO2013126020A1 discloses a dual self-winding device for retracting wires of a headphone. The wires are thinner and more delicate than typical cords, such as wires of a headset for a personal electronic device. The dual, self-winding retractable device has two independently moving winding reels with gearing. Each of the independent reels allow one electrical wire to be extended or retracted into a housing for a personal electronic device.

Chinese Patent No. 201435748Y discloses a cellular phone lanyard device comprising a rotating wheel on a circular shall within a shell. A torsion spring is arranged on a bottom portion of the rotating wheel for biasing rotation of the rotating wheel in one rotational direction. An outer surface of the wheel is provided with an annular groove for accommodating a lanyard within the groove, such that the lanyard is wound around the wheel. Rotation of the rotating wheel is limited by a jamming device that can set the length of the lanyard that extends from the annular groove of the rotating wheel. Chinese Patent. No. 202664469U discloses another type of extendable and retractable lanyard. Chinese Patent No. 1218456C discloses a retractable cord reel.

Many different designs exist for wire reels and the like, but none of these have provided an easy to use and reliable lanyard and tether system for cellular phones. Miniaturized, compact reels break and are unreliable. Thus, most reels of this type are external and replaceable. Having a retractable lanyard integratable within a housing of case for a cellular phone is known to add substantial bulk to the case. A malfunction of the mechanism can require replacement of the entire case or a difficult and expensive repair of the mechanism. Neither is practical. Especially in countries where there is a substantial concern about cellular phone radiation emissions effect on soft tissue such as the brain, extension and retraction of earbuds has received some attention. Earbud extension and retraction devices that can be integrated into a cellular phone case use delicate wires and cannot serve as reliable tethers and do not include a lanyard, which would put unacceptable stress on the earbud wires. The only exceptions to this are few and use external lanyards that are not retractable.

SUMMARY

A retractable lanyard comprises a retraction device removably integratable within a cellular phone case or protective device, a first tether retractably extendable from an outlet of the retraction device and a second tether retractably extendable from the outlet of the retraction device, such that the first tether, the second tether and the retraction device form a loop capable of being disposed around the neck of a person as a lanyard. The retraction device having a shape. A case or protective device for an electronic device, such as a cellular phone, capable of fitting securely over the electronic device during use of the electronic device without interfering with use of the electronic device. The case or protective device having a void, the void of the case or protective device providing a cut-out in the surface of the case or protective device, the cut-out having a shape, the shape of the retraction device being selected such that the retraction device fittingly engages the shape of the cut-out, extending through a thickness of the case or protective device. The retraction device being securely retained in the cut-out by a portion of the case or protective device engaging a mating portion of the retention device.

In one example, the retention device does not add any bulk to the case or protective device by being inserted into the void provided in the case or protective device.

Alternatively, the retention device is capable of extending above an external surface of the case or protective device when the retention device is installed and used with the case or protective device and an electronic device.

For example, a mating portion may be a beveled edge around at least a portion of the circumference of the void of the case or protective device, such that a corresponding surface of the retraction device is matingly engaged, and the retraction device is retained within the void of the cellular between by the beveled edge on one side of the retraction device and the cellular device on an opposite side of the retraction device. In one example, the shape of the void and the shape of the retention device both resemble a keyhole shape. For example, a wheel and retraction biasing mechanism, such as a torsion spring, are disposed within a circular portion of the keyhole shape of a housing of the retention device, and a locking mechanism is disposed in the "key" portion of the keyhole shape of the housing with an exposed portion of the first tether and the second tether extending from an outlet formed in the key portion.

Herein, a "cut-out" means a shape formed in a surface of the case or protective device that extends through a surface of the case or protective device, although a thin veneer or film extending over the cut-out should be understood to fall within the meaning of a void for the purposes of claim interpretation. The "cut-out" provides a thickness of a case or protective device as a void for a body of a low-profile retraction device. However, a cut-out is a void that extends through the thickness of the case or protective device and is compared to a void which may have a veneer, film or portion of a surface of the cover or protective device extending over the body of the retraction device.

Herein, a "key" portion refers to a non-circular portion of the housing oldie retention device, such as a trapezoidal portion, which extends from a circular portion of the housing of the retention device. Thus, a "keyhole shape" is a shape than includes a central portion, such as a circular portion of a housing, and a key portion, such as a trapezoidal portion of a housing. The central portion need not be perfectly circular or even substantially circular. As the housing may take any shape. However, internally, a wheel and a torsion spring applying a bias for retracting the tethers is typically used as a space saving and efficient shape for a retraction device.

It should be understood that a keyhole shape may take on a variety of shapes comprising a central portion and a peripheral portion extending from the central portion. A keyhole shape provides an advantage over some other shapes for a retraction device, because the circular portion may be used for storing significant lengths of the first and second tethers, and a torsion spring may be easily coupled with spools for spooling the first and second tethers. The peripheral portion provides room for a locking device and an outlet for the ends of the first and second tethers. In this way, a low-profile, highly reliable retraction device may be provided with sufficient tether lengths to form a lanyard that fits over a person's head and extends comfortably around a person's neck. In one example, a keyhole shaped retraction device provides these functions without adding any more bulk to the case or protective device than would have been added for providing protection to the electronic device.

In one example, a coupling device is provided on each of the first tether and the second tether, such that the first tether and the second tether may be coupled together by connecting the coupling device of the first tether with the coupling device of the second tether. For example, an end of the first tether may extend through a first coupling device, and an end of the second tether may extend through a second coupling device, the first coupling device and the second coupling device providing a press fit coupling when the first coupling is inserted into the second coupling or vice versa the second coupling is inserted into the first coupling. Alternatively, other coupling mechanisms may be used, such as magnetic coupling, hook and loop coupling, latch and ring coupling and the like.

In one example, an earbud speaker extends from at least one of the first and second tethers and the earbud speaker is electrically connected to a wire that is slidably engaged through the coupling, such that the earbud speaker may be extended from the lanyard when the lanyard is formed around the neck of a person, and the earbud speaker may be inserted into the ear of the person.

The designs of the examples provided in the summary and detailed description are the result of many attempts and failures to create a low-profile, reliable and commercially attractive lanyard system. Besides the devices disclosed in the background section, which do not disclose all the features of the examples provided in the detailed description, various failed attempts at commercially viable designs have been made to provide a drop-stop cellular phone lanyard capable of extending around a person's neck and preventing damage to a cellular phone prior to the retractable lanyard system of the examples.

In one failed attempt, powerful magnets were used to attach a lanyard to a metal plate. Concern relating to the effect of the magnets on the signal and electronics in a cellular phone, perhaps damaging the electronics, required a complete redesign of the mechanism tethering the lanyard to the cellular phone. Attempts at all embedded, retractable lanyard/leash/strap also failed, initially. In one failed attempt, a mechanism was attached to the back of a cellular phone. While this attempt successfully provided certain features of a retractable necklace lanyard or bracelet lanyard, the product design appeared bulky, unattractive and marred the back surface of the cellular phone, if detached.

Even after choosing to embed the retraction mechanism within a case or protective cover, design failures continued, making the case too bulky for acceptance by consumers, for example. Even after selecting a new, low-profile design for the retraction device, problems continued.

A low-profile, reliable retraction device is, accepted more readily if removably insertable within a case or protective device. By designing the mechanism for retaining the retraction device to include a void in the case or protective device, no bulky appearance is added by the retraction device. Extending the retraction device through at least a portion of the thickness of the case or protective device, provides sufficient thickness for a low-profile retraction device to provide tether lengths capable at providing a lanyard that comfortably fits around a person's neck, while still avoiding any bulky protrusions from the case or protective device. Examples of designs illustrated in the drawings and described in the specification are attractive to consumers, reliable modular and provide for ease of use in a variety of lanyard configurations, whether holstered or unholstered, for example. A damaged or malfunctioning retraction devices may be readily swapped for a functioning retraction device by the user, if replacement is necessary, without replacing the entire cover or protective device. Furthermore, branding and promotional advertisements may be placed on an exposed retraction device or a blank filling the same space, without modifying the cover or protective device, allowing the concept to be used as a comparatively low-cost promotional item.

BRIEF DESCRIPTION OF THE DRAWINGS

The following drawings are illustrative examples and do not further limit any claims that may eventually issue.

When the same reference characters are used, these labels refer to similar parts in the examples illustrated in the drawings.

DETAILED DESCRIPTION

Figure 1:
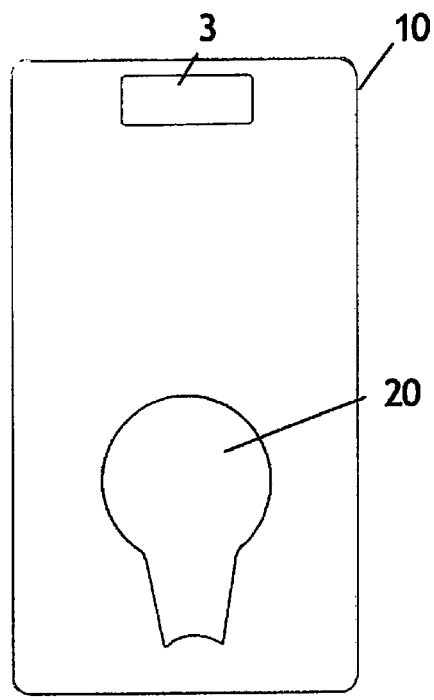
FIG. 1 illustrates an example of a bottom view of a case.
Figure 3:
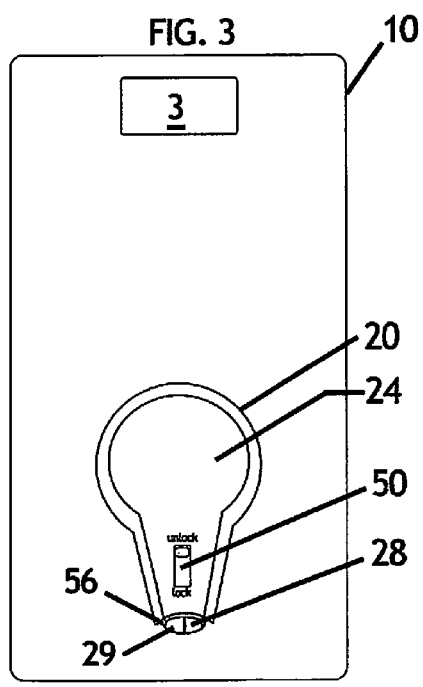
FIG. 3 illustrates a retraction device and lanyard removably integrated into the examples of FIGS. 1 and 2.

In FIG. 1, an example of a bottom view of a case or protective device is illustrated for an electronic device, such as a cellular telephone (not shown). The example shows a protective cover 10 having voids 3, 20 formed in the cover 10. For example, a camera void 3 is a cut-out through the surface of the cover 10. Herein, the term cut-out refers to a void that extends through a surface, such that a through-hole exists. Alternatively, a void may not extend completely through the surface of the case, such as having a thin film or layer of material remaining at a surface and a hollowed-out portion forming a void within the cover. For a camera, unless the film or layer is transparent to light, a cut-out 3 is used. The cut-out 3 may have a transparent cap or insert that fills the camera cut-out. Such a cap or insert may be present in addition to the cut-out formed in the cover of the case or protective device 10. In one example, a retraction device cut-out 20 provides a cavity for the insertion of a retraction device 24, as illustrated in FIG. 3, for example. The retraction cut-out 20 allows a user to operably slide a slidable switch 50 in the example illustrated in FIG. 3.

Figure 2:
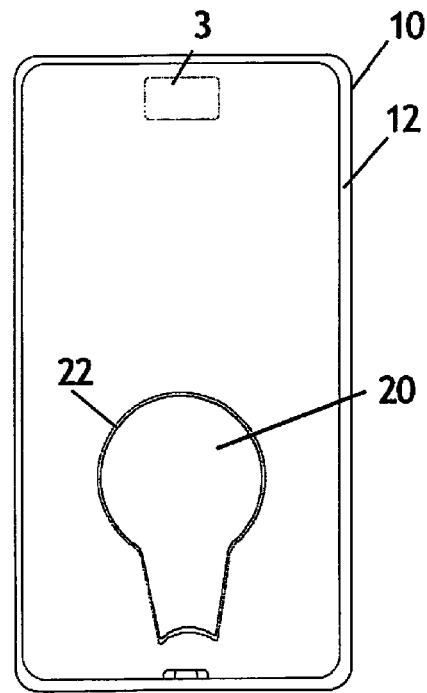
FIG. 2 illustrates a top view of the example of FIG. 1.

In FIG. 2 an example of a view of an opposite side of the cover 10 is shown. The cover 10 may have a beveled edge 22 capable of securing a retraction device 24 securely within the cut-out 20 of the cover 10. Specifically, the retraction device 24 may have a corresponding beveled edge that matingly couples with the beveled edge 22 of the cut-out 20, such that the retraction device 24 is securely disposed between a cellular phone surface (not shown) and the beveled edge 22 of the cut-out 20, for example.

Figure 4A:
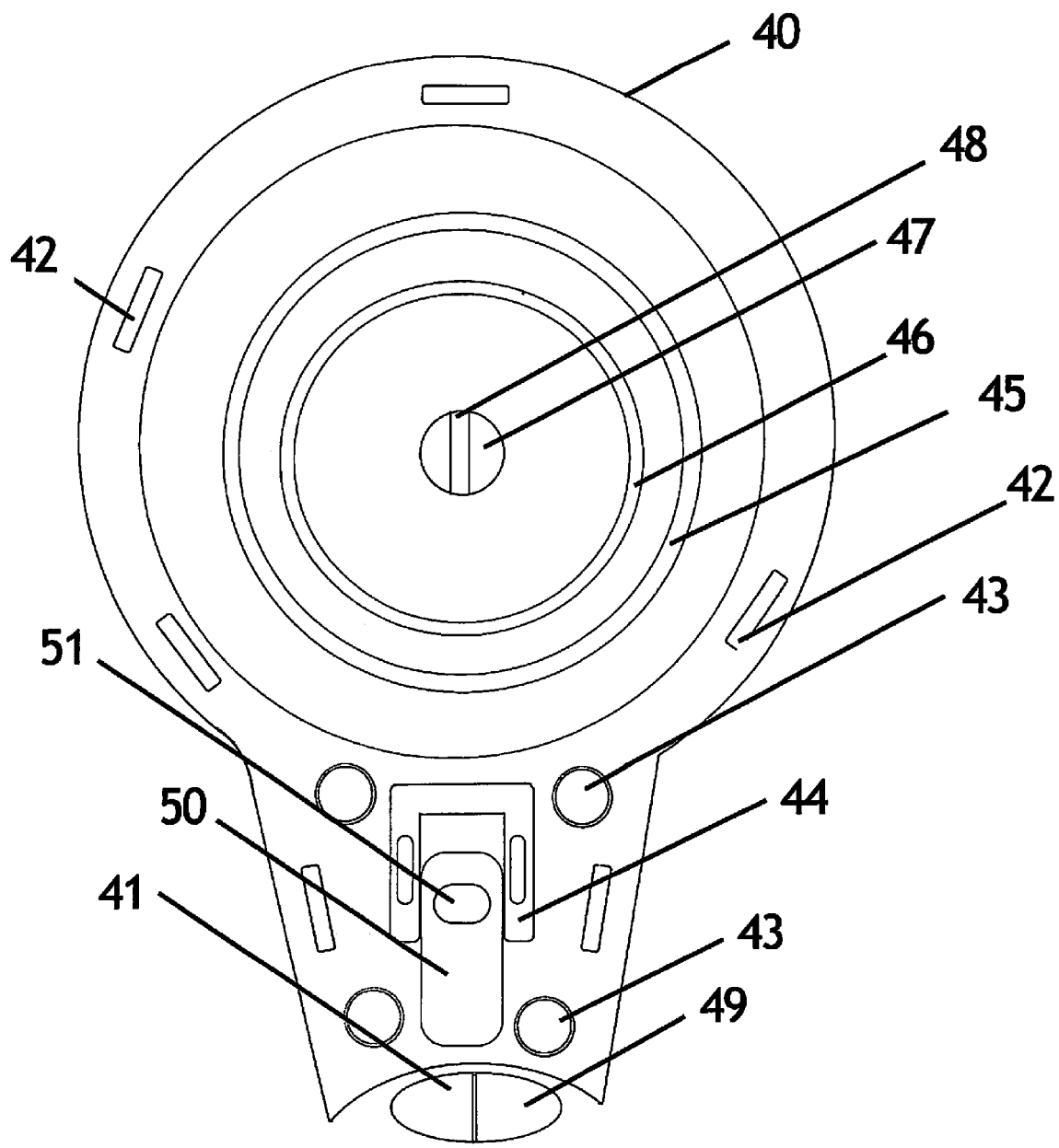
FIGS. 4A and 4B illustrate an example of a portion of a housing and mechanism of a retraction device including (A) without a biasing mechanism and tethers shown and (B) with an example of a biasing mechanism and a portion of tethers illustrating the internal mechanism for retracting the tethers.
Figure 5:
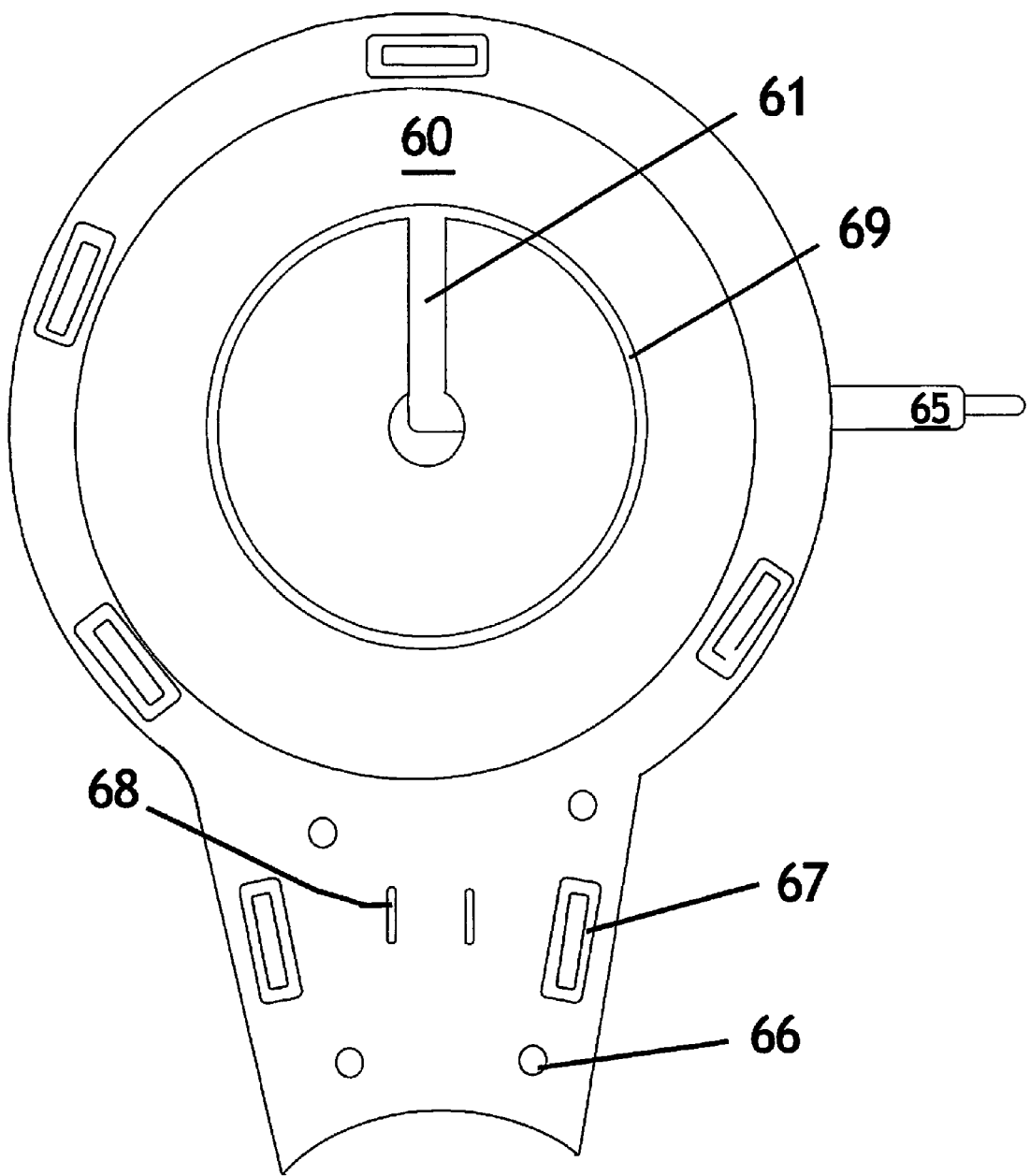
FIG. 5 illustrates an example of opposite portion of the housing illustrated in FIGS. 4A and 4B.

In the drawing of FIG. 4A, an example of a first portion of retraction device 24 is illustrated. A housing 40 is formed comprising a plurality of locking tabs 42 shaped and configured to engage corresponding locking tab slots 67 in a second portion of the retraction device 24, as illustrated in the example of FIG. 5, such that the second portion 67, when matingly fitted opposite of the first portion, creates an enclosure for the mechanism of the retraction device 24. For example, a pair of extending flanges 68 may be arranged on the second portion 60, the first portion or both to matingly fit a portion of the mechanism, such as a slider housing 44, retaining the portion of the mechanism in a fixed position within the retraction device 24, when the retraction device 24 is assembled, for example. Also, male posts 66 of the second portion 60 may be arranged to matingly fit female posts 43 on the first portion 40, or vice versa.

Figure 4B:
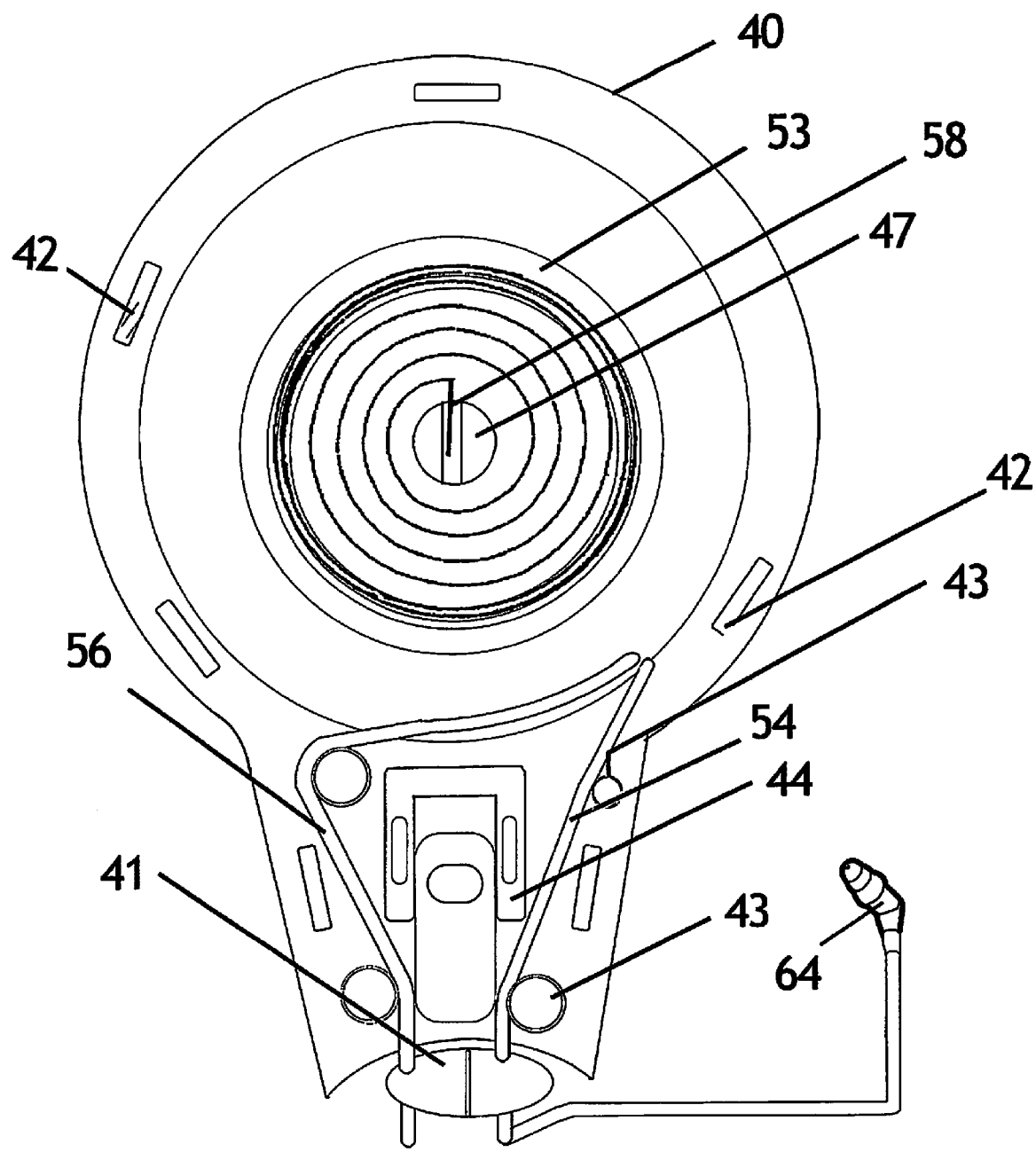

In the example of FIG. 4A, annular protrusions 45, 46 extend upwardly from an inner surface of the housing 40, as guides for a rotating barrel or spool 53, as illustrated in the example of FIG. 4B. In FIG. 4B, the annular protrusions 45, 46 are not illustrated to reduce confusion and to provide an example where the barrel 53 is disposed in a groove formed in an inner surface of the housing 40. The protrusions form a groove between them, but a groove may be thrilled directly within the surface, also, for example. Continuing in the example of FIG. 4A, a biasing mechanism anchor 47 is shown disposed within a central portion of the housing 40. The example of the anchor 47 has a slot or slit 48 formed in the anchor 47 for coupling with a corresponding end of the biasing mechanism. A slidable locking mechanism 50 is shown inserted in the slider housing 44, for example. The slider housing 44, slidable locking mechanism 50 and female posts 43 may be arranged and configured for guiding and locking tethers retractably coupled to the spool 53 to a lanyard coupling 41, 49, for example. Alternatively, as illustrated in FIG. 3, a coupling 28, 29 may be provided that engages each tether at by one of the portions 28, 29 of the coupling, and the coupling may be threadingly engaged together by rotating around the end of a tether 56, for example, inserted through an end of a portion 29 of the coupling 28, 29. Each portion of the coupling 28, 29 may rotatingly engage its respective tether, allowing both portions to rotate during threading or only one of the tethers 56 may be rotatingly engaged on a portion 29, allowing that portion to rotate and threadingly engage the other portion 28 of the coupling 28, 29, for example. Therefore, the examples of FIG. 3 and FIG. 4B may be combined, if a threadingly engaged coupling, as illustrated in FIG. 3, is combined with one or more extendable earbuds, as illustrated in FIG. 4B.

As illustrated in the example of FIG. 4B, a first tether 56 is coupled to one portion 41 of the lanyard coupling 41,49 extending through an opening in one end of the housing 40, around a first one of a plurality of female posts 43, around an opposite side of a next one of the plurality of female posts 43, and is directed to the spool 53, such that the tether is co-wound on the spool 53 with a second tether 54. In the example, the second tether 54 is directed around the same sides of both of the female posts 43, in contrast to the first tether, which winds through the mechanism on opposite sides of two female posts 43. Where the two tethers 53, 54 come together, they continue to be wound around the spool 53. This is not shown in order to reduce confusion, and a person having ordinary skill in the art may readily identify the wrapping arrangement of the tethers from that point until the ends are coupled with through-holes, slots or slits in the spool 53, for example.

A mainspring 58 is illustrated as an example of a biasing mechanism and provides a comparatively constant torsion between the fixed anchor 47 and the spool 53, providing a retraction force for retracting the tethers into the retraction device 24, unless the slidable locking mechanism 50 is engaged to impinge the tethers 54, 56 between the slidable locking mechanism 50 and the female posts 43, as illustrated in the example of FIG. 4B. When the slidable locking mechanism 50 releases the tethers 54, 56, by not impinging the tethers 54, 56 between the mechanism and the female posts, then the mainspring 58 applies a retraction force through the spool 53, which acts as the barrel for mainspring 58, spooling the tethers 54, 56 onto the spool 53 within the housing 40, 60 of the retraction device 24, unless a user pulls on the lanyard coupling 41, 49 to extend the tethers 54, 56 and provide a lanyard, such as a lanyard capable of being placed around a person's neck, for example.

In FIG. 4B, an earbud 64 is electrically coupled by an electrical conductor within the tether to a connector for transmitting electrical impulses to an earphone within the earbud 64. The details of the earphone are not illustrated, but earbuds are well known in the art.

In this example, the opposite end of the tether may be coupled directly to an audio output jack of a portable electronic device by an audio output jack coupling 65, as illustrated in the example of FIG. 5. An electrical contact ring 69 may make electrical contact with the spool or an electrically conductive portion of the spool such the electrical conductor in the tether is capable of carrying a signal from the output jack coupling 65 through the conductor 61, the contact ring 69, the contact portion of the spool or a conductive spool 53 through a conductive portion of the tether 54 to the earphone of the earbud 64. Two earbuds may be provided using a plurality of conductors extending through one or both of the tethers and making electrical contact with a plurality of contact rings or contact ring portions, for example.

As disclosed, and as readily apparent to a person having, ordinary skill from the disclosure, various combinations and variations of the examples disclosed, are within the scope of the invention.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A retractable lanyard comprises:
 a retraction device removably integratable within a cellular phone case or protective device;

a first tether retractably extendable from an outlet of the retraction device; and a second tether retractably extendable from the outlet of the retraction device, such that the first tether, the second tether and the retraction device form a loop capable of being disposed around the neck of a person as a lanyard, wherein the retraction device has a shape and the case or protective device having a void, and the void has a shape, the shape of the void being formed, at least in part, by a hole extending entirely through the thickness of a wall of the case or protective device such that the shape of the retraction device is accommodated retainably within the shape of the void of the case or protective device wherein the shape of the void of the case or protective device comprises a beveled edge, and the beveled edge of the shape of the void of the case or protective device retainably engages a beveled edge of the shape of the retraction device, such that the retraction device is retained within the case or protective device by the beveled edge of the shape of the void of the case or protective device retainably engaging the beveled edge of the shape of the retraction device.

2. The retractable lanyard of claim 1, wherein a portion of the retraction device extends beyond an external surface of the wall of the case or protective device.

3. The retractable lanyard of claim 1, wherein the shape of the retraction device is defined by a housing having a keyhole-shaped perimeter.

4. The retractable lanyard of claim 3, wherein the retraction device further comprises a wheel and a retraction biasing mechanism disposed within a circular portion of the keyhole-shape perimeter of the housing of the retraction device.

5. The retractable lanyard of claim 4, wherein the biasing mechanism is a torsion spring.

6. The retractable lanyard of claim 5, wherein a locking mechanism is disposed in the keyhole-shaped housing, with an exposed portion of the first tether and the second tether extending from the outlet formed in the housing.

7. The retractable lanyard of claim 6, wherein the locking mechanism and the outlet are in the key portion of the housing.

8. The retractable lanyard of claim 1, further comprising a coupling device provided on each of the first tether and the second tether, such that the first tether and the second tether may be coupled together by connecting the coupling device of the first tether with the coupling device of the second tether.

9. The retractable lanyard of claim 1, wherein an end of the first tether extends through a first coupling device, and an end of the second tether extends through a second coupling device.

10. The retractable lanyard of claim 9, wherein the first coupling device and the second coupling device provide a press fit coupling when the first coupling device is inserted into the second coupling device.

11. The retractable lanyard of claim 9, wherein either of the first coupling device or the second coupling device comprise a magnetic coupling.

12. The retractable lanyard of claim 9, wherein the first coupling device and the second coupling device include a hook and loop coupling.

13. The retractable lanyard of claim 1, further comprising an earbud speaker extending from at least one of the first tether and second tether.

14. The retractable lanyard of claim 13, wherein the earbud speaker is electrically connected to a wire that is slidably engaged through the coupling, such that the earbud speaker extends from the lanyard when the lanyard is formed around the neck of a person, and the earbud speaker is insertable into the ear of the person.

* * * * *